United States Patent
Hans et al.

(10) Patent No.: US 9,094,503 B2
(45) Date of Patent: Jul. 28, 2015

(54) METHODS AND APPARATUS FOR CONTACT INFORMATION REPRESENTATION

(75) Inventors: Martin Hans, Bad Salzdetfurth (DE); Andreas Schmidt, Braunschweig (DE)

(73) Assignee: Apple Inc., Cupertino, CA (US)

( * ) Notice: Subject to any disclaimer, the term of this patent is extended or adjusted under 35 U.S.C. 154(b) by 415 days.

(21) Appl. No.: 12/704,449

(22) Filed: Feb. 11, 2010

(65) Prior Publication Data

US 2011/0196868 A1   Aug. 11, 2011

(51) Int. Cl.
| | |
|---|---|
| G06F 17/30 | (2006.01) |
| H04M 3/00 | (2006.01) |
| H04M 1/2745 | (2006.01) |
| H04M 1/725 | (2006.01) |

(52) U.S. Cl.
CPC .... H04M 1/274583 (2013.01); H04M 1/27455 (2013.01); *H04M 1/274508* (2013.01); *H04M 1/72572* (2013.01); *H04M 2250/60* (2013.01)

(58) Field of Classification Search
CPC . G06Q 10/10; G06Q 10/06311; G06Q 50/01; G06Q 10/109; G06Q 10/1093; G06Q 20/322; G06Q 30/0267; G06Q 90/00; G06Q 10/1095; G06Q 10/063114; G06F 11/3438; G06F 17/30991; G06F 17/30997; G06F 3/041; G06F 3/0482; G06F 3/0488; G06F 17/30867; G06F 3/04817; G06F 17/3053; G06F 17/30551; G06F 17/30554; G06F 17/3087; G06F 3/04842; H04M 1/274583; H04M 1/27455; H04M 1/72572; H04M 1/274508; H04M 2250/60; H04L 41/22; H04L 4/02; H04L 51/32; H04W 4/008; H04W 4/02

USPC ......... 707/723, 724, 725, 732, 752, 919, 951, 707/737, 802; 455/418
See application file for complete search history.

(56) References Cited

U.S. PATENT DOCUMENTS

| | | | | |
|---|---|---|---|---|
| 7,266,395 | B2 * | 9/2007 | Schnurr | 455/567 |
| 7,418,663 | B2 * | 8/2008 | Pettinati et al. | 715/739 |
| 7,440,746 | B1 * | 10/2008 | Swan | 455/412.1 |

(Continued)

FOREIGN PATENT DOCUMENTS

| | | |
|---|---|---|
| JP | 2002-99675 | 4/2002 |
| JP | 2005-109896 | 4/2005 |

OTHER PUBLICATIONS

European Patent Application No. 11703092.4—Extended European Search Report dated Aug. 20, 2014.

*Primary Examiner* — Jean B Fleurantin
*Assistant Examiner* — Evan Aspinwall
(74) *Attorney, Agent, or Firm* — Downey Brand LLP

(57) ABSTRACT

Methods and apparatus for the convenient arrangement of a user's address book according to intelligent algorithms. These intelligent algorithms, in one embodiment, take advantage of one or more of: (i) stored contact information associated with one or more users, (ii) stored geographic location information associated with the users and one or more contact entries in the user's address book, and/or (iii) stored voice and data communication information associated with the user. This algorithm arranges the entries in the users address book, using the stored information as an input, in an intelligent manner. In other embodiments, additional information is used as an input to the contact entry arranging algorithms such as, for example, entries in a user's digital calendar. Business methods utilizing the aforementioned methods and apparatus are also disclosed.

22 Claims, 12 Drawing Sheets

(56) References Cited

U.S. PATENT DOCUMENTS

| | | | |
|---|---|---|---|
| 7,603,360 B2* | 10/2009 | Ramer et al. | 1/1 |
| 7,620,404 B2 | 11/2009 | Chesnais et al. | |
| 7,623,854 B2 | 11/2009 | Satoh | |
| 7,634,463 B1* | 12/2009 | Katragadda et al. | 1/1 |
| 7,685,144 B1* | 3/2010 | Katragadda | 707/999.101 |
| 7,696,868 B1* | 4/2010 | Emigh | 340/539.13 |
| 7,774,002 B1* | 8/2010 | Ortega et al. | 455/456.2 |
| 7,831,684 B1* | 11/2010 | Lawler et al. | 709/217 |
| 2003/0063128 A1* | 4/2003 | Salmimaa et al. | 345/810 |
| 2003/0069874 A1* | 4/2003 | Hertzog et al. | 707/1 |
| 2004/0017376 A1 | 1/2004 | Tagliabue et al. | |
| 2005/0065980 A1* | 3/2005 | Hyatt et al. | 707/104.1 |
| 2005/0177614 A1* | 8/2005 | Bourne | 709/200 |
| 2006/0085419 A1* | 4/2006 | Rosen | 707/9 |
| 2006/0209690 A1* | 9/2006 | Brooke | 370/230 |
| 2007/0005363 A1* | 1/2007 | Cucerzan et al. | 704/256 |
| 2007/0150444 A1* | 6/2007 | Chesnais et al. | 707/3 |
| 2007/0255807 A1* | 11/2007 | Hayashi et al. | 709/219 |
| 2008/0133580 A1* | 6/2008 | Wanless et al. | 707/102 |
| 2008/0227440 A1 | 9/2008 | Settepalli | |
| 2009/0119246 A1* | 5/2009 | Kansal | 707/2 |
| 2009/0150488 A1* | 6/2009 | Martin-Cocher et al. | 709/204 |
| 2009/0171866 A1* | 7/2009 | Harun et al. | 706/12 |
| 2009/0234874 A1* | 9/2009 | Sylvain | 707/102 |
| 2009/0292782 A1* | 11/2009 | Kim et al. | 709/206 |
| 2010/0058196 A1* | 3/2010 | Krishnan et al. | 715/747 |
| 2010/0161831 A1* | 6/2010 | Haas et al. | 709/235 |
| 2010/0330972 A1* | 12/2010 | Angiolillo | 455/418 |
| 2011/0087887 A1 | 4/2011 | Luft et al. | |
| 2011/0196925 A1 | 8/2011 | Hans et al. | |

* cited by examiner

METHODS AND APPARATUS FOR CONTACT INFORMATION REPRESENTATION

CROSS-REFERENCE TO RELATED APPLICATIONS

This application is related to co-owned and co-pending U.S. patent application Ser. No. 12/704,445 filed contemporaneously herewith on Feb. 11, 2010 and entitled "METHODS AND APPARATUS FOR PROVIDING PRESENCE SERVICE FOR CONTACT MANAGEMENT REPRESENTATION", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of data representation. More particularly, in one exemplary aspect, the present invention is directed to methods and apparatus for contact information representation in user equipment devices, such as for example those used in wireless networks.

2. Description of Related Technology

Address books, in an electronic form, are databases that are used for storing entries that are now colloquially known by users as "contacts". Due to the ever growing list of capabilities of today's computing devices (such as desktop computers, laptops, smartphones and the like), the information stored in these contact entries has also grown such that individual entries now may include without limitation: (1) a name; (2) a picture associated with the name; (3) various phone number(s) (i.e., home, work, cellular, etc.); (4) e-mail address(es) (both personal and work-related); (5) fax number(s); (6) user name(s) associated with various services (i.e. instant messaging applications, Facebook™, Twitter™, etc.); and (7) various other related information associated with a user (i.e., birthdays, names of related family members, anniversary dates, etc.).

In addition to the large amount of information now stored within individual contact entries associated with a user's address book, the number of contacts stored in the user's address book has also grown such that there are often too many entries to be easily navigated. This results from a number of factors, including the intermingling of less frequently used contact entries among contact entries that are more commonly used. Furthermore, because contact entries are now frequently entered and shared during an initial meeting with a personal acquaintance or business associate (whether manually or electronically), these names tend to become forgotten by the user, making it difficult to later recall the name of that particular acquaintance or business associate, or how the user knows them.

Various methods and apparatus exist in the prior art for managing a user's contact list entries. For example, the Gmail™ webmail service provided by Google, Inc. allows a user to arrange contact list entries according to various user-defined groupings. However, these various groupings must be manually assembled by the user, and therefore have many of the same limitations of prior art address books as discussed above.

Other common address book implementations, such as the address book available in many existing smartphones, also include a search function which permits a user to navigate his or her address book by entering information associated with an entry (i.e., a contact entry's first or last name). However, the ability to locate specific contact information under this model is again predicated on the user's ability to accurately recall specific information about that entry.

Many of today's address books in cellular telephones or smartphones allow a user to arrange contacts by arranging contacts in special lists. For example, a user can have contacts arranged by those contacts which have been most recently dialed, from which the user has most recently received or most recently missed a call, etc., each sorted by date (and often time). However, these special lists are call-oriented, and thus they arrange contacts by information related to calls to the contacts that have taken place (or were supposed to be taking place), and are therefore predicated on either: (1) frequency of communication with a particular contact entry; or (2) proximity in time between a prior communication or attempted communication.

Based on the foregoing, improved methods and apparatus are needed for automating the grouping of contacts within a user's address book, so as to overcome many of the deficiencies present in prior art solutions as set forth above. Such improved methods and apparatus would ideally arrange contacts in a manner better associated with how a user thinks about his or her listing of contact entries, rather than merely organizing contacts in alphabetical order, by manually entered user-defined groupings, or by frequency/timing.

Moreover, such improved methods and apparatus would permit individual contacts to be associated with multiple distinct or inter-related group listings, so as to provide additional flexibility in the representation of these contact entries to a user.

Lastly, these improved methods and apparatus should ideally leverage existing hardware and software to the maximum extent possible so as to facilitate their implementation on existing or legacy devices, as well as minimize deployment costs.

SUMMARY OF THE INVENTION

The present invention satisfies the foregoing needs by providing, inter alia, methods and apparatus for contact information representation.

In a first aspect of the invention, a method of arranging contact information is disclosed. In one embodiment, the contact information includes a plurality of contacts in an address book associated with a user's portable device, and the method includes: storing first data associated with a first portion of the plurality of contacts, the first data comprising geographic information; storing temporal information associated with the user; and arranging the first portion of the plurality of contacts using at least the first data and the stored temporal information.

In one variant, the method further includes: receiving the first data from an external entity via a network interface prior to storing the first data.

In another variant, the method further includes storing second data associated with the first portion of the plurality of contacts, the second data comprising communication information; and arranging the first portion of the plurality of contacts using at least the first and second data and temporal information. The communication information may comprise e.g., voice call information or data call information.

In another variant, the act of arranging is based at least in part on a physical proximity of the user to a physical location, and/or to at least a portion of the user's contacts.

In yet another variant, the address book is maintained by a mobile network entity in communication with the portable device.

In another embodiment, the method includes arranging the plurality of contacts in a time sequential order, the time sequential order of the plurality of contacts determined at least in part by a geographic proximity between the user of the portable device and individual ones of the plurality of contacts.

In one variant of this embodiment, the act of arranging further includes determining an elapsed time since the user of the portable device was within the predetermined geographic proximity to individual ones of the plurality of contacts, and the time sequential order takes into account the elapsed time since the user of the portable device was within the predetermined geographic proximity for at least a portion of the plurality of contacts.

In a further variant the geographic proximity is determined based on a satellite-based fix of the portable device obtained from the portable device. For example, it may be based on the satellite-based fix of the portable device and data obtained from corresponding satellite receivers of portable devices of the plurality of contacts, based on the satellite-based fix of the portable device and data obtained from one or more base stations associated with portable devices of the plurality of contacts, or based on the satellite-based fix of the portable device and data obtained from one or more WLAN access points associated with devices of the plurality of contacts.

In yet another embodiment, the method includes grouping a portion of the plurality of contacts based at least in part on a predetermined geometric proximity between the user of the portable device and the portion of the plurality of contacts.

In one variant, the portion is grouped by being within the predetermined geometric proximity of the user of the portable device within a given time slot.

Alternatively, the portion is grouped by being within the predetermined geometric proximity of the user of the portable device at the same time.

In still a further embodiment, the method includes: arranging at least a portion of the plurality of contacts based on the occurrence of a meeting between the user and one or more of the contacts.

In one variant of this embodiment, the occurrence of a meeting between the user and another entity is based at least in part on satellite receiver data relating to the user's location at the time of the meeting, and positioning information of a portable device associated with the one or more contacts at the meeting.

In another variant, the occurrence of a meeting is determined at least in part via a short-range wireless communication (e.g., Bluetooth pairing) between the user's portable device and a device of a contact at the meeting.

In yet another variant, the occurrence of a meeting is determined at least in part via a short-range wireless communication (e.g., Bluetooth pairing) between the user's portable device, a stationary third device at the meeting location (e.g., a short-range wireless communication device deployed in a restaurant, a train station, an airport lounge, etc.) and a device of a contact at the meeting.

In a second aspect of the invention, a computer readable apparatus is disclosed. In one embodiment, the apparatus includes a storage medium with at least one computer program stored thereon, the at least one computer program comprising a plurality of computer executable instructions that when executed by a processor: provide an address book associated with a first user, the address book comprising a plurality of contacts; and arrange the plurality of contacts into a first group based on a geographic proximity parameter, the first group comprising individual ones of the plurality of contacts which were part of a communication with the first user when the geographic proximity parameter met a first criterion.

In a third aspect of the invention, portable apparatus is disclosed. In one embodiment, the apparatus includes: a processor; a storage device in data communication with the processor; and a computer program stored on the storage device and operative to run on the processor, the program which when executed arranges at least a portion of a plurality of contacts within a user's contact management function based at least in part on the occurrence of a meeting between the user and one or more of the contacts.

In one variant, the arrangement of at least a portion of a plurality of contacts is further based at least in part on the temporal relationship between the meetings of the user with each of the at least portion of contacts.

In another variant, the apparatus further comprise apparatus enabling at least one of relative or absolute geo-positioning of the portable apparatus. The apparatus enabling at least one of relative or absolute geo-positioning of the portable apparatus is used by the computer program in determining the occurrence of a meeting between the user and at least one of the contacts.

In a fourth aspect of the invention, a method for transmitting data associated with arranged contact information is disclosed. In one embodiment, the information is transmitted at least in part from a network-based server.

In a fifth aspect of the invention, a system for contact information representation is disclosed.

In a sixth aspect of the invention, a business method for providing arranged contact information to one or more users is disclosed.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
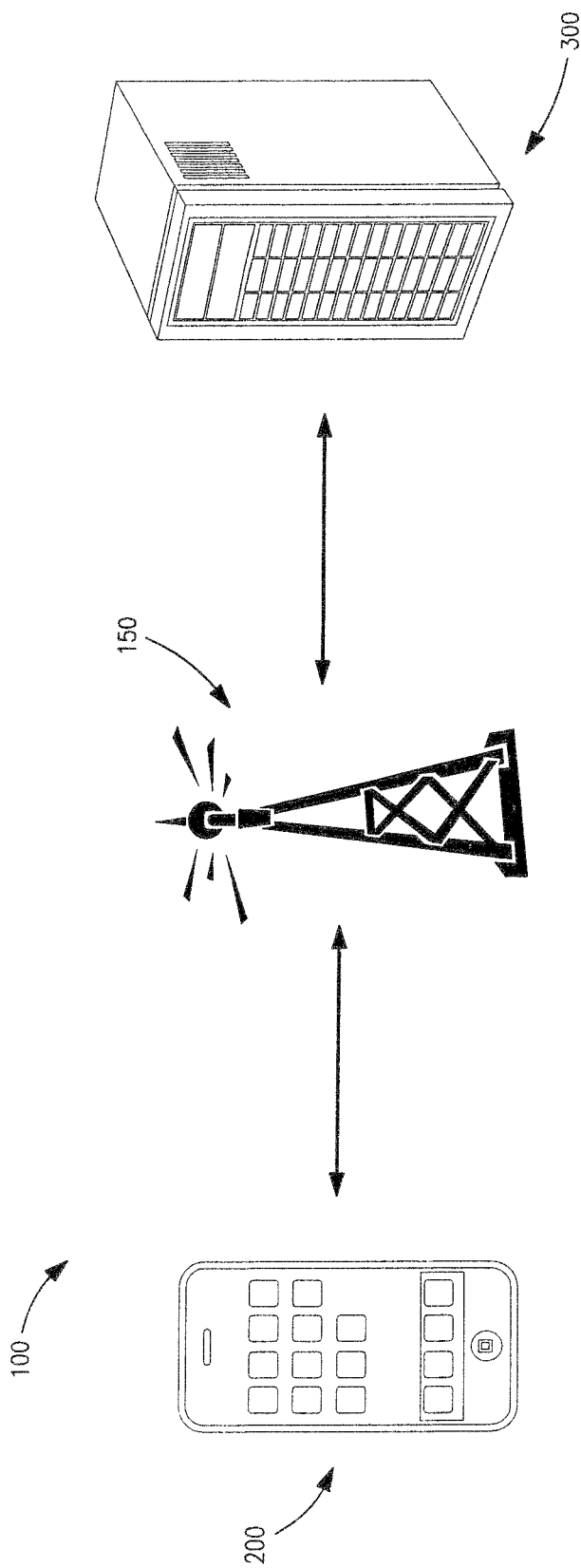
FIG. 1 is a graphical representation illustrating an exemplary embodiment of generalized system architecture implementing the methodologies of the present invention.

Reference is now made to the drawings, wherein like numerals refer to like parts throughout.

Overview

The present invention discloses, inter alia, methods and apparatus that facilitate the convenient arrangement of a user's address book and related information according to "intelligent" algorithms. These intelligent algorithms take advantage of generally predictable user behavior. For example, when a user is visiting a customer and arrives at the customer's premises and starts his or her address book application, the likelihood of calling that particular customer is higher than calling any other person in that user's address book (e.g., to let the customer know that the user has arrived, or to determine which gate at the facility the user should use, etc.). Accordingly, it is useful to present to the user a list of only those contact entries that are likely for the user to want to contact.

Similarly, if a user has just met with a group of friends, and wishes to place a call a few minutes later from the user's car, the likelihood of calling any of the recently visited friends is often higher than the average likelihood of calling anyone else from the phone book. More generally, the likelihood of calling any given person in a user's address book is expected to decrease with the amount of time elapsed since meeting with that person physically (or the time in advance of a prospective meeting or interaction).

In addition, the present invention recognizes that these general rules are not true for every contact in a user's address book, or every situation that a user might find themselves in, and therefore it is desirable that the foregoing algorithms be adaptive to exceptions to the "general rule(s)".

The present invention accomplishes the foregoing functions in one embodiment by storing contact information associated with one or more users, storing geographic location information associated with the users (and one or more contact entries in the user's address book), and storing voice and data communication information associated with the user. This stored information is then utilized as an input to an algorithm which arranges the entries in the users address book in an intelligent manner. In other embodiments, additional information is used as an input to the contact entry arranging algorithms such as, for example, entries in a user's digital calendar.

The improved methods and apparatus disclosed herein have several advantages over prior art solutions, largely in that they do not require a user to scroll through a long list of contact entries, or otherwise recall specific information about a contact (such as a contact entries name, etc.). In addition, the methods and apparatus disclosed herein are in certain variants highly automated, thereby reducing the number of steps a user needs to perform in order to gain access to the information of most use to the user in a timely fashion.

DETAILED DESCRIPTION OF EXEMPLARY EMBODIMENTS

Exemplary embodiments of the present invention are now described in detail. While these embodiments are discussed primarily in the context of arranging contact information associated with an address book of a user, it will be recognized by those of ordinary skill that the present invention is not so limited. In fact, various aspects of the invention are useful in the automated arrangement of a near limitless amount of categorized data based on parameters relating to behavioral patterns or rules; e.g., such as geographic location and temporal proximity, such as described above. For example, the principles of the present invention could apply equally to the presentation of recently accessed word processing documents to a user on a user's portable computing device based on the current location of that user (e.g. whether at home or at work). Myriad other such applications will be recognized by those of ordinary skill given the present disclosure.

Moreover, while the following exemplary embodiments of the invention are described in the context of presenting a user's contacts for the purposes of initiating a communication with that particular contact (e.g., telephone call, SMS/text message, "tweet", email, page, etc.), it is appreciated that the present invention could apply to broader/other applications, such as the editing of data associated with that particular contact, or deleting that contact entry from the user's address book.

Apparatus—

Referring now to FIG. 1, one embodiment of generalized system architecture for implementing the methodologies of the present invention is illustrated. The system architecture 100 includes one or more user equipment client devices (UE) 200, as well as a network entity apparatus 300, which are in communication with one another via a transceiver 150. The UE 200 can include any number of devices including, without limitation, personal computers (PCs), such as for example an iMac™, Mac Pro™, Mac Mini™ or MacBook™, and mini-computers, whether desktop, laptop, or otherwise, as well as mobile devices such as handheld computers, smartphones (such as for example an iPhone™), PDAs, video cameras, set-top boxes, personal media devices (PMDs), such as for example an iPod™ touch, or any combinations of the foregoing. The transceiver 150 can also include any number of devices including, for example, a cellular base station (e.g., UMTS/LTE/LTE-A eNodeB, Home Node B, femtocell, etc.) or a wireless master station or access point (AP). The network entity apparatus 300 consists of a generalized computing apparatus architecture that facilitates the acquisition of data for use in the arrangement of data on the UE 200. While a specific generalized architecture is shown in FIG. 1, it is recognized that a myriad different network configurations useful with the present invention will be recognized by those of ordinary skill provided the present disclosure. For example, it is envisioned that in certain implementations, the network entity apparatus 300 is altogether obviated from the system architecture, with the UE (or another entity) performing the processing described subsequently herein, thereby avoiding having to establish or maintain a connection with a host network (e.g., RRC or the like).

Figure 2:
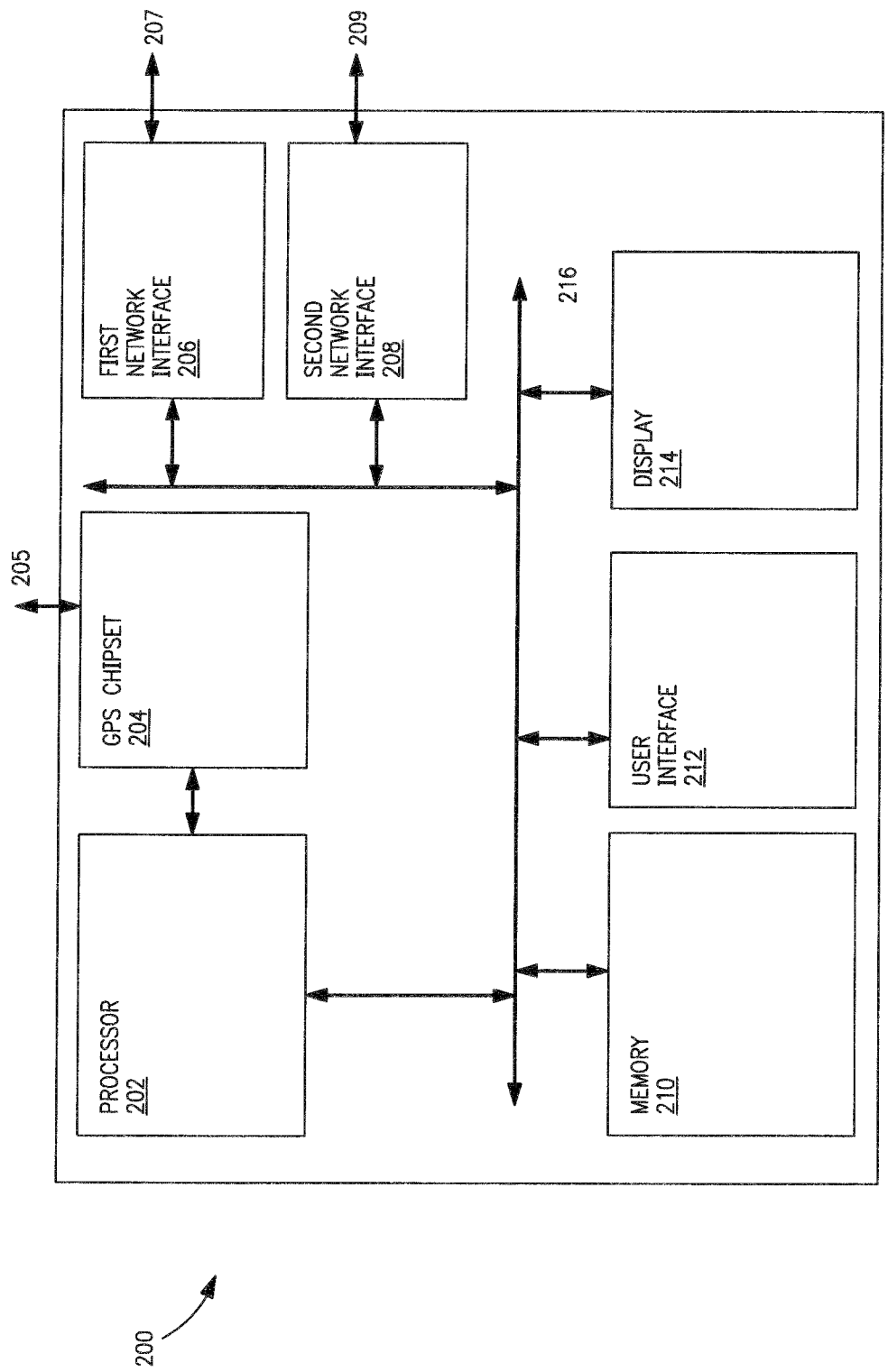
FIG. 2 is a functional block diagram illustrating one embodiment of user equipment (UE) implementing the methodologies of the invention within the architecture of FIG. 1.

Referring now to FIG. 2, a generalized UE architecture 200 is illustrated in detail. The UE includes a processor 202 coupled via a bus architecture 216 to a number of different components present within the UE. As used herein, the terms "processor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

The UE also includes memory 210 useful, for example, in storing data associated with the arrangement of contact information associated with a user's address book, as described subsequently herein. The term "memory" refers to any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

The UE also includes in one embodiment a global positioning system (GPS) or Assisted GPS (A-GPS) receiver or chipset 204 with an interface 205 in communication with GPS satellites orbiting the earth. In addition, the UE also includes a user interface 212 (e.g., a keyboard, trackball, touch screen/multi-touch interface, etc.) as well as a display 214 for conveying the arranged contact information from an address book to the user.

In the illustrated embodiment, the UE possesses two network interfaces 206, 208 with respective communication links 207 and 209. In an exemplary embodiment, these network interfaces 206, 208 include an interface to both a 3G or LTE wireless network as well as a Wi-Fi wireless network, although it is appreciated that more or less network interfaces could be present as well as network interfaces to a variety of different protocol standards other than 3G, LTE and Wi-Fi including without limitation Bluetooth™, HSDPA/HSUPA, TDMA, CDMA (e.g., IS-95A, WCDMA, etc.), GSM, PAN/802.15, WiMAX (802.16), MWBA (802.20), PCS/DCS, analog cellular, satellite systems, millimeter wave or microwave systems, acoustic, and infrared (i.e., IrDA).

Figure 3:
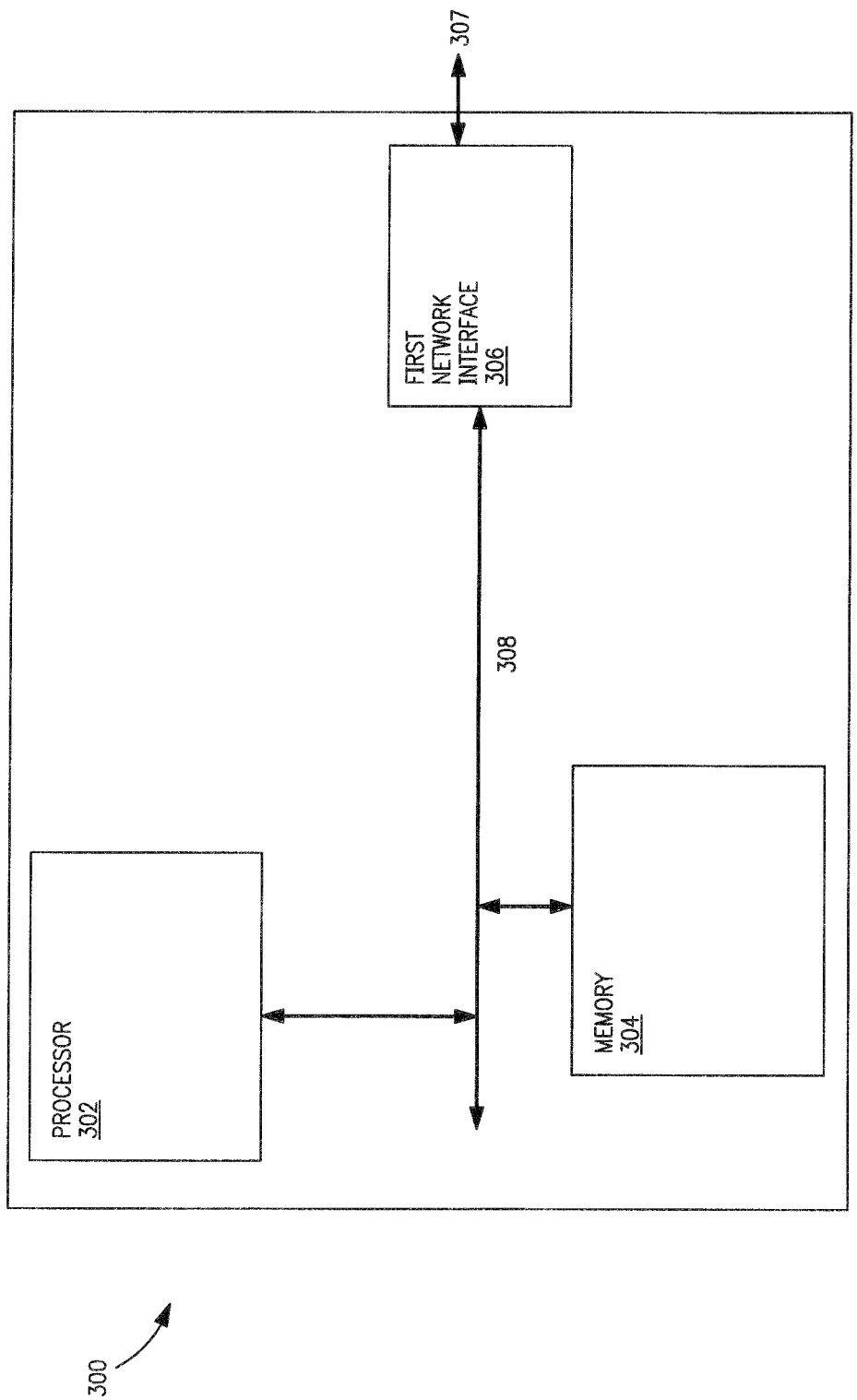
FIG. 3 is a functional block diagram illustrating exemplary network apparatus implementing the methodologies of the present invention.

Referring now to FIG. 3, a generalized architecture for a network apparatus 300 useful in implementing the methodologies of the present invention is described. The network apparatus includes a processor 302 coupled to memory 304 via a bus architecture 308. The memory 304 contains one or more computer programs stored thereon that, when executed by the processor, execute one or more method steps as subsequently described herein. The executed method steps are then stored back in memory for later transmission to other entities on the network. In addition to the above, the network entity apparatus 300 also includes a network interface 306 to a communication link 307. The communication link 307 is in operative communication with the various UE devices on the network through either a direct or indirect communications channel. Accordingly, the data stored that is resultant from the executed method steps can be transmitted to other entities on the network via the communication link.

Methods—

Figure 4:
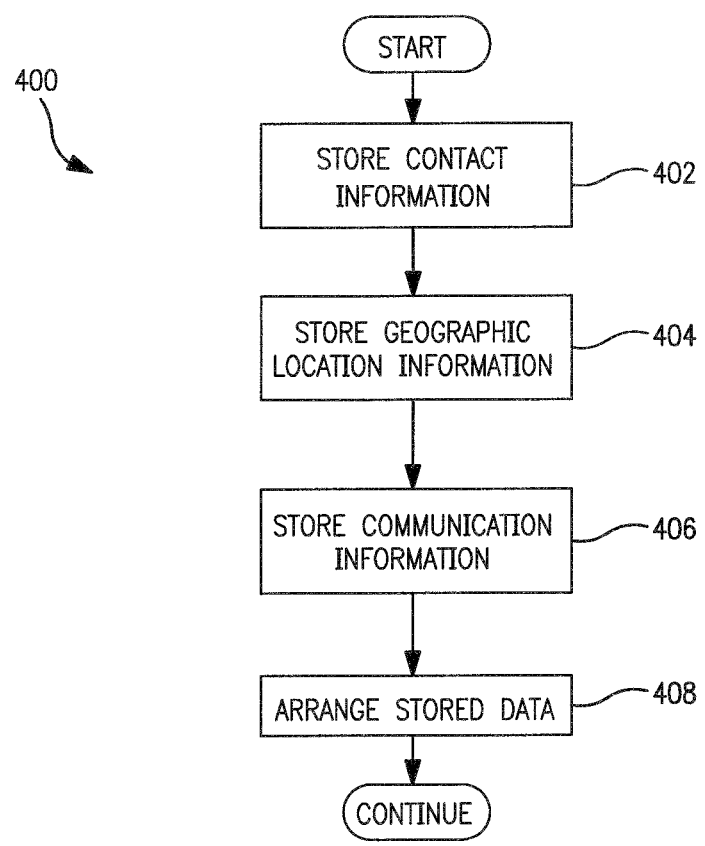
FIG. 4 is a process flow diagram illustrating one embodiment of a method for arranging contact information associated with a user's address book in accordance with the invention.

Referring now to FIG. 4, an exemplary embodiment of a method for arranging stored contact information data in one or more computerized apparatus is shown and described in detail. While the following methodology is primarily envisioned as a software application resident on a computer readable apparatus having a storage medium that is executable by a digital processor (e.g., the device of FIG. 2 and/or FIG. 3 discussed above), it is envisioned that the steps described herein can be implemented in hardware and firmware as well, or alternatively as some combination thereof. As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

At step 402, contact information for various contacts associated with a user is stored in memory. In an exemplary embodiment, the contact information for a given contact is entered manually by the user via inputs received from a user using a given user interface. The user interface can consist of any number of well known user interfaces such as a keyboard, a touch-screen, voice-recognition software, and the like. This manually entered data can then be stored on one or more computerized apparatus such as the exemplary UE 200 illustrated in FIG. 2, the network entity apparatus 300 illustrated in FIG. 3, or some combination of the two entities discussed previously herein.

In an alternative to the manual entering of data or as a supplemental processing step to the manual entering of data, the contact information could also be downloaded from a remote software application to the computerized apparatus associated with the user, via either a wired or wireless network connection. The remote software application, upon gaining proper authorization from the user, can assemble and distribute various pre-entered contact information into the address book of the user. For example, in one exemplary implementation, a user might enter a username and password associated with a web service mail client (e.g. MobileMe™ by Apple, Inc., Gmail™ by Google, Inc., etc.). The user's UE then uses a software application to log into the user's web service mail client, compile contact information stored on the web service mail servers, optionally check for redundant information, and download the contents of the contact list from the web service for storage locally on the user's UE client.

As another mechanism (whether supplemental to the aforementioned techniques or as an alternative), the contact information can be exchanged via an automated mechanism and stored locally on a user's computing device. For example, a user's UE may be equipped with software and/or hardware which permit the user to automatically pull contact information (or alternatively receive push-based messages) from a remote application once contact information of interest to the user becomes available. One such implementation accomplishes this functionality via a user's Bluetooth™ (BT) network interface resident on the user's UE device (such as an Apple iPhone™). The BT module associated with the UE detects the presence of other UE capable devices within range of the UE (either directly or via an intermediate (e.g., stationary) device which is also equipped with short range technology), and whenever a contact of interest to the device is present, a software application on the UE makes a request for contact information of the contact of interest and exchange contact information over the BT ad hoc network.

In the case where the short range communication aimed at acquiring contact information of interest to the user becomes available is performed by means of a stationary or mobile intermediate device, the intermediate device may provide the location and/or time information of interest.

At step 404, data associated with one or more geographic locations is stored. In one exemplary embodiment, the various geographic locations stored are associated with the user's physical locations. Preferably these geographic locations are stored as a function of time; i.e., the geographic locations stored also possess temporal information (such as the time when the user was located at a given location, and/or the duration the user was in a given location). For example, many of today's modern smartphones also possess a global positioning system (GPS) or A-GPS receiver or chipset, such as the exemplary UE illustrated in FIG. 2. The integrated GPS capability of the smartphone can then be utilized in conjunction with a software application to store geographic information for later use when arranging a user's address book contacts. Alternative geographic locating techniques with more or less levels of granularity including well known triangulation techniques, association with a wireless base station or access point (e.g., cellular, Wi-Fi, etc.) could also be used in lieu of, or in addition to, GPS systems.

RFID or other "near field" systems could also feasibly be used; e.g., interrogation of a passive RFID tag associated with the user (e.g., the interrogation or the user's backscattered reply to the interrogation may also be intercepted by a receiver on their mobile device, or passed to the mobile device via a short-range channel such as Bluetooth, etc.). The user's mobile device may alternatively be equipped with two-way near-field communication capability so that the interrogation can be received and logged, thereby fixing the user's location at a given time), and a reply sent to the interrogation to identify the user, transfer their account information, etc. for the proposed transaction.

The invention also contemplates in alternate embodiments the use of user-provided location data, such as by the user entering their current location via a touch-screen interface (e.g., touching an icon representing their home, office, favorite restaurant, car, etc.), speech input system ("I am in the office"), etc.

In addition to the user's location information, geographic information associated with a user's contacts can also be stored in memory. For example, for any given contact in a user's address book, the various geographic locations visited by that contact can also be logged in memory. Preferably, the system utilized for storing geographic information associated with a user's contacts will be identical to that utilized by the user (i.e. for purposes of system simplicity); however it is contemplated that disparate systems can also be used and the information culled from these disparate systems is used as input to the user's address book arranging applications.

Location information for the contacts in the user's address book may be obtained using any number of different techniques, and from any number of different sources, which may or may not be the same as those referenced above for obtaining the user's location or position. For example, the locations of contacts may be provided by the user's mobile network (directly, where the contacts are also user's of the same service provider), or indirectly (such as from other mobile service providers) based on e.g., association with a given base station or AP by the contact(s), GPS data sent from their receivers, user-entered data, and so forth.

Coordinated transactions between the user and a contact (e.g., Bluetooth inquiry/pairing/bonding events) may also be used as a mechanism for determining user and/or contact location. In this sense, the user's "absolute" position at a given time may not be known, but their position relative to the contact is known definitively, due to the short-range nature of the PAN (e.g. Bluetooth) interface. Hence, in one such variant, the user's mobile phone uses its Bluetooth interface to conducts a well known pairing or bonding operation with the contact's Bluetooth-equipped mobile device when they are in sufficient proximity to one another (say, 10 meters or so, depending on various conditions). The pairing exchange is stored in the user's mobile device, and the Bluetooth ID for the contact is associated with their address book entry, along with a time reference. Hence, the "smart" address book application of the invention knows that the two persons "met" at the recorded time, although it may not know precisely where.

In another variant, the storage of the Bluetooth pairing/bonding exchange is used to trigger a reading of the user's GPS receiver, which then associates an absolute geographic coordinate with the pairing event, and the position data can be saved along with the Bluetooth-related data if desired. The absolute position data can then be correlated if desired to known user-specific locations such as the user's home, office, favorite restaurant, child's school, etc.

In another variant, the user's address book application can be configured to invoke the contact's device to transmit its GPS coordinates via e.g., the PAN interface between the two devices. For instance, where both devices are outfitted with address book applications according to the present invention, the user's device can, during bonding or pairing (or thereafter), transmit a request for current GPS coordinates from the contact device. This approach is useful when, inter alia, the user's device does not have absolute positioning capability (i.e., no GPS receiver).

Moreover, in yet another variant, "proof" or attestation of the meeting or various attributes thereof can optionally be derived from the exchange, such as via the methods and apparatus described in co-owned and co-pending U.S. patent application Ser. No. 12/576,989 filed Oct. 9, 2009 and entitled "METHODS AND APPARATUS FOR DIGITAL ATTESTATION", which is incorporated herein by reference in its entirety.

The foregoing "relative" positioning approaches have the advantage of being based on data from only user devices (e.g., the user's handset, and the contact's handset), without having to go back to the host mobile network(s) to obtain location data for the contact. However, it is recognized that the use of a network entity apparatus for requesting transmission of absolute location information from a network entity apparatus to the mobile device can also be employed. For example, the Bluetooth pairing/bonding process may trigger transmission of absolute location information or assistance data from a network entity. Furthermore, the assignment of absolute positioning data generated in the mobile device to user specific or user predefined locations can be done with network entity assistance.

A significant obstacle expected in the acquisition of geographic information associated with various contacts in a user's address book is privacy. In order to address issues of privacy, an exemplary implementation of the aforementioned function stores geographic location about various contacts in a user's address book in a form so that it is not directly accessible by the user. For example, a business associate of the user might want the user to have access to geographic information associated with that business associate strictly for the purpose of allowing the user to organize and arrange a user's address book; however the business associate would likely not like the user to know specific locations of where that business associate was located at any given time. Accordingly, the geographic information gathered by the system can optionally be stored in an encrypted manner, which would only be accessible to the address book representation software (e.g. via a private key) and not directly to the user.

As another alternative, the information may be kept "in the clear" (i.e., not encrypted), yet the identity of the user whom with it was associated could be kept private or anonymized, such as via cryptographic hashing of the other user's identifying information (e.g., personal information or device/network information, such as MAC address, IP address, network ID, etc.). Hence, each different user would have a unique hash, which could be generated by any platform having the hashing algorithm (e.g., a sender could hash their ID, and the receiver could generate the same hash to positively associate the received information with a contact. This approach obviates the overhead of processing (e.g., encrypting/decrypting) the information while still maintaining the privacy of the other user.

Preferably, temporal information associated with various contacts geographic locations is also be stored, so as to aid in the arranging of stored data as subsequently described herein.

At step 406, data associated with a user's communication to other parties is stored. In an exemplary embodiment, this data is stored locally on a user's UE, as the UE would likely have ready access to this information. This data includes relevant information such as phone calls received by the user, phone calls dialed by the user, or data otherwise associated with missed calls on a user's UE. In addition, data associated with the duration of phone calls received and phone calls dialed is also stored. Furthermore, information about the parties involved in the call as well as the number (i.e. work, home, cellular, etc.) utilized for that call will also be stored. In addition to information regarding phone calls, the data stored could also keep track of SMS texts, e-mails, instant messages, as well as to the presentation of recently accessed and/or (recently consumed) files, such as text files, spreadsheets, presentations, media files, mp3 songs, etc.

At step 408, the data stored in memory on the one or more computerized apparatus (and associated with a user and his or her contacts) is assembled and arranged according to a multiplicity of algorithms. While primarily envisioned as either pulling (or receiving push-based messages) at least a portion of the data necessary for arrangement from a network entity and arranging the data locally on the user's device, it is recognized that the network entity itself can compile all the relevant data necessary for the arrangement of the contact, arrange the data and then transmit: (i) this arranged data itself, or (ii) simply transmit metadata (e.g., in the form of an XML file, textual message, or the like) associated with this arranged data, the metadata indicative of how this data should ultimately be arranged on the user's device, to the user. The latter approach has the benefit of reduced use of communication bandwidth, but also may require greater processing overhead on the mobile device (i.e., to read, understand, and implement the "instructions" present in the metadata). In addition, a manual selection of data by the user could be implemented by representing the data with tags, similar to known browser tags, or by graphical display icons representing the various groupings.

The foregoing arrangement algorithms may either be predetermined (e.g., established by the developers of the indigenous software or a downloaded application), or established dynamically, such as via inputs received by the user, or updates received over a network. The arrangement of data is preferably performed using an N-dimensional matrix as a model, where N can be set to virtually any integer value desired, with the only significant limitation being the complexity of presenting the visualized information to the user's display. In many common usage scenarios, an integer value of N=1 or N=2 will often be sufficient for the typical user. The use of an N-dimensional matrix is perhaps best illustrated, however, via the illustration of examples as set forth below.

For instance, where N is set equal to one (1), the contacts in an individual user's address book are sorted or grouped based on a single parameter, such as time elapsed since having met a contact, with the arrangement of contacts being ordered from more recently visited contacts that are arranged ahead of those contacts which have not recently been visited. In a typical usage scenario, a user might be expected to more frequently have visited (contacts of) close family members (e.g. a user's wife, children, etc.) more often then distant relatives. Accordingly, arranging contacts according to this single parameter will prioritize close family members, which are expected to be in frequent contact with the user, ahead of more distant relatives, which are expected to be much less frequently in contact with the user.

In an example where the integer value N is set equal to two (2), the contacts in the user's address book are sorted or grouped based on two differing parameters such as, for example, (1) the time since last meeting a contact within a user's address book, and (2) the distance to places the user has met that particular contact. These and other examples of single and multi-dimensionally arranged matrices are described more fully subsequently herein below with respect to various illustrative specific examples.

It is appreciated that other combinations where the number of dimensions (N) is greater than two (2) are also possible. For example, with N set equal to three (3), one possible representation of a user's address book might take into account: (1) the time elapsed since the last personal meeting with a given contact, (2) the geographic location of the last meeting, as well as (3) the contacts affiliation to a user-defined group. The third dimension in this example (i.e., affiliation to a user-defined group) can further delineate groupings within a user's address book. For example, the user-defined group might distinguish between business colleagues and personal friends, or friends and family. This is particularly useful where the granularity between time and location is not sufficient for distinguishing between groupings of contacts.

Automated arrangement of the user's contacts could be done in a multiplicity of ways and preferably in a way that ensures one or more basic criteria are met. For example, these basic criteria might include: (1) ensuring that the number of groups used in the arrangement of data is significantly high, e.g. more than three (3), while maintaining the total number of arranged groups at a manageable number that takes into account, for example, the capabilities of the device display (e.g. no more than twelve (12)); and (2) ensures that any leftover contacts, that is the "group" of contacts that do not fit within the currently applied grouping criterion, are grouped into a remaining group that is also manageable. Ideally, the grouping algorithm(s) chosen would take into account the data available to it such that the grouping algorithm(s) would fulfill the above-mentioned basic criteria resulting in for example, twelve (12) groups with ten (10) entries each. Ideally, any automated grouping algorithm(s) chosen would fulfill the basic criteria while simultaneously maintain the average entries per group such that they are substantially equal.

As can be readily appreciated, the use of data stored at steps 402-406 of the method 400 can afford a user with great flexibility in sorting a listing of contact entries in a user's address book. Specifically, these entries can be sorted and arranged according to any number of differing contact information parameters. For example, and without limitation, the representation of contact information for a user can be arranged according to: (1) time elapsed since having met with a particular contact; (2) time elapsed since having been near to a given contact; (3) current distance to a location where the last meeting with a contact took place; and (4) current distance to a particular location while the user was on the phone (or otherwise in data communication) with a particular contact, etc.

Furthermore, in addition to arranging contacts individually, contacts within a user's address book can also be grouped according to the data stored at steps 402-406 described previously herein. For example, representation of contacts within a user's address book can be, without limitation: (1) grouped according to contacts that have met within the same time slot (e.g. during normal working hours); (2) grouped according to having met the user at the same place (e.g. at the user's home or office location); and (3) grouped according to having talked with, or otherwise been in data communication with, the user via telephone at the same geographic location or during the same time slot. These and other specific implementations are now described with respect to specific examples as set forth below.

In another embodiment of the invention, contacts that are at a given time too close in terms of geographic proximity to the user may be reduced in priority (or eliminated from consideration altogether) when prioritizing contacts. For instance, two people (e.g., phones) are in very close geographic range of one another (e.g., a few meters, such as having dinner together, or within the same premises) can be considered to be "too close to call", since they are probably either in visual sight of one another, or aware of each other. Hence, if the user invokes their address book function while this condition of proximity exists, it is highly unlikely that he/she will want to call the proximate other person(s). This filtration or reduction in priority can be masked, however, with other user- or network-imposed rules (e.g., a user may specify that his/her family members will always be at the top of the list, regardless of location, such as for safety reasons).

In another embodiment of the invention, contacts are filtered or prioritized based on (i) temporal proximity to a known or projected event; and (ii) historical information regarding activities (e.g., calls or meetings with contacts) on the date and/or time of interest. This function can also be masked or overlaid with data regarding geographic proximity to a location associated with the event (if any). As an example of the foregoing, consider a user who has a good friend or significant other who has a birthday on November 5 every year. Each year on or about that day, the user calls their friend to wish them "happy birthday", or they meet at their favorite restaurant for dinner. Hence, the address book application of the invention may be programmed to determine the then-current date (say November 3), and determine that the friend is a "high probability" contact based on the historical meetings/calls. As the temporal difference between current date/time and target date/time reduces, the priority of that contact may be increased. This approach also advantageously acts as a "passive" reminder to the user of the impending event, in that whenever the user invokes their address book function during that time period, they will increasingly see that contact (friend) elevated in priority, thereby reminding them that some event of significance is impending. The logic of the foregoing functionality can also be implemented such that, for example, after the target date/time, the priority: (i) may slope off with time, generally symmetric with in the run-up to that date/time (just in case the user missed the event for some reason); or (ii) there is a steep roll-off or even filtration, such that the priority is significantly reduced or set to "zero". This latter option can also be masked or enabled with any actual data regarding indicating that the user was located at the target location (e.g., favorite restaurant, friend's house, etc.) on or about the target date, such that it is known that the "event" requirements have been met by the user.

Network-Based

In yet another alternative embodiment of the invention, the "address book" of a given user may be maintained at the network, such as on a network address book server or "presence" server. One exemplary implementation that discusses the sharing of information among user's via the use of presence service and which may be used consistent with the present invention is described in co-owned and co-pending U.S. patent application Ser. No. 12/704,455, entitled "METHODS AND APPARATUS FOR PROVIDING PRESENCE SERVICE FOR CONTACT MANAGEMENT REPRESENTATION", filed contemporaneously herewith, the contents of which are incorporated herein by reference in its entirety.

Example No. 1

Figure 5:
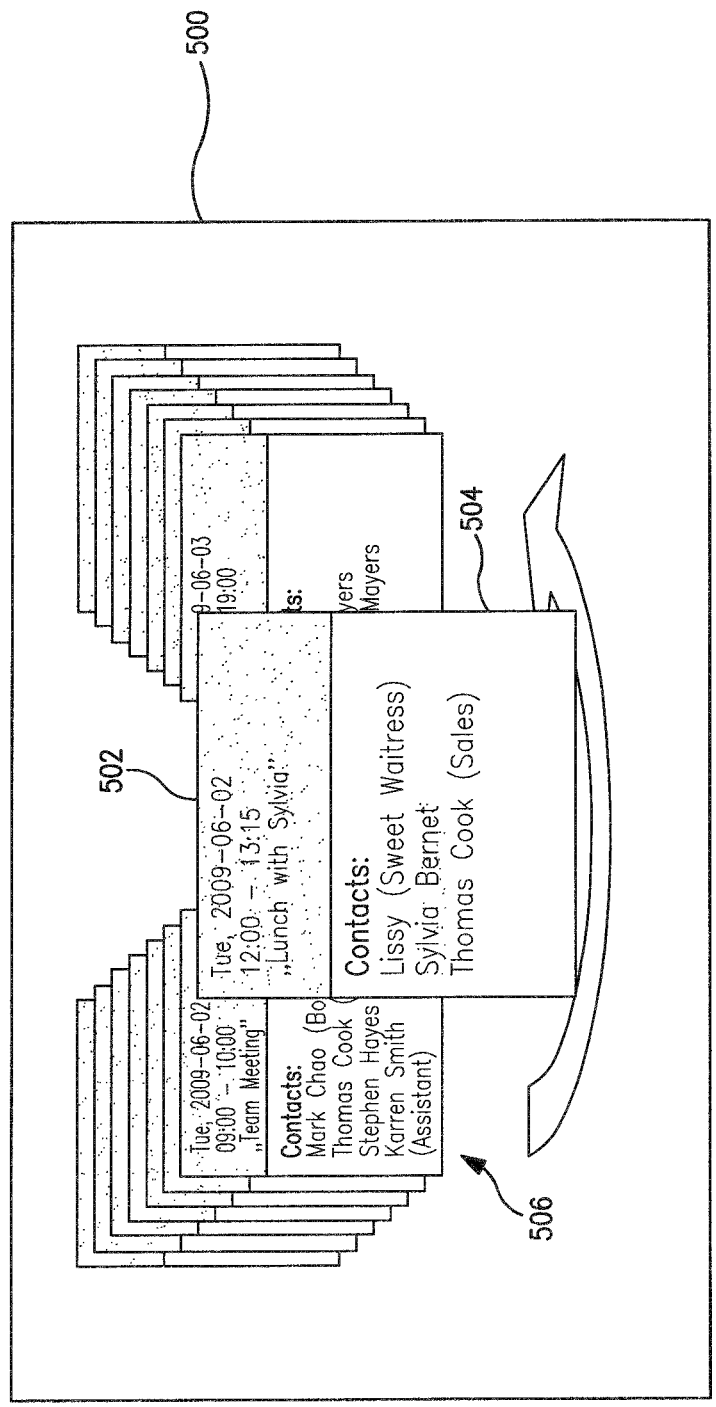
FIG. 5 is a graphical user interface screenshot implementing an exemplary "cover flow" representation of contact information arranged in accordance with the principles of the present invention.

Referring now to FIG. 5, an exemplary representation of an address book in the iconic 'Cover-flow' style of the Assignee hereof on a user's UE display 500 is illustrated. In the example illustrated, the user is able to sort through his or her grouping of contacts as a function of a particular day's meetings or events. These meetings or events could be organized vis-à-vis the user's calendar entries on that particular day. The prominently displayed event in FIG. 5 is in relation to a lunch meeting that occurred on Tuesday, the $2^{nd}$ of June, 2009 (it is appreciated that the foregoing date is merely illustrative, and dates in the future, with projected attendees, may be provided also). This is set forth in the title portion 502 of this particular entry, pulled from the user's calendar.

Illustrated in the contact portion 504 of the event is a list of contacts that were actually present during this event entitled "Lunch with Sylvia". Other than the subject of the event (i.e., Sylvia), the contact portion also sets forth an entry "Thomas Cook" whose job title "Sales" is also listed alongside and entry "Lissy" who is both a friend of the user as well as the waitress present during the lunch meeting with Sylvia and Thomas. As the user scrolls through various entries, the user can settle on another entry 506 entitled "Team Meeting" that occurred from 9:00 AM to 10:00 AM on the $2^{nd}$ of June, 2009. For this entry 506, various contacts are illustrated for those entries in the user's address book which were also physically present (or in voice or data communication with the attending parties) at this particular event.

Figure 6:
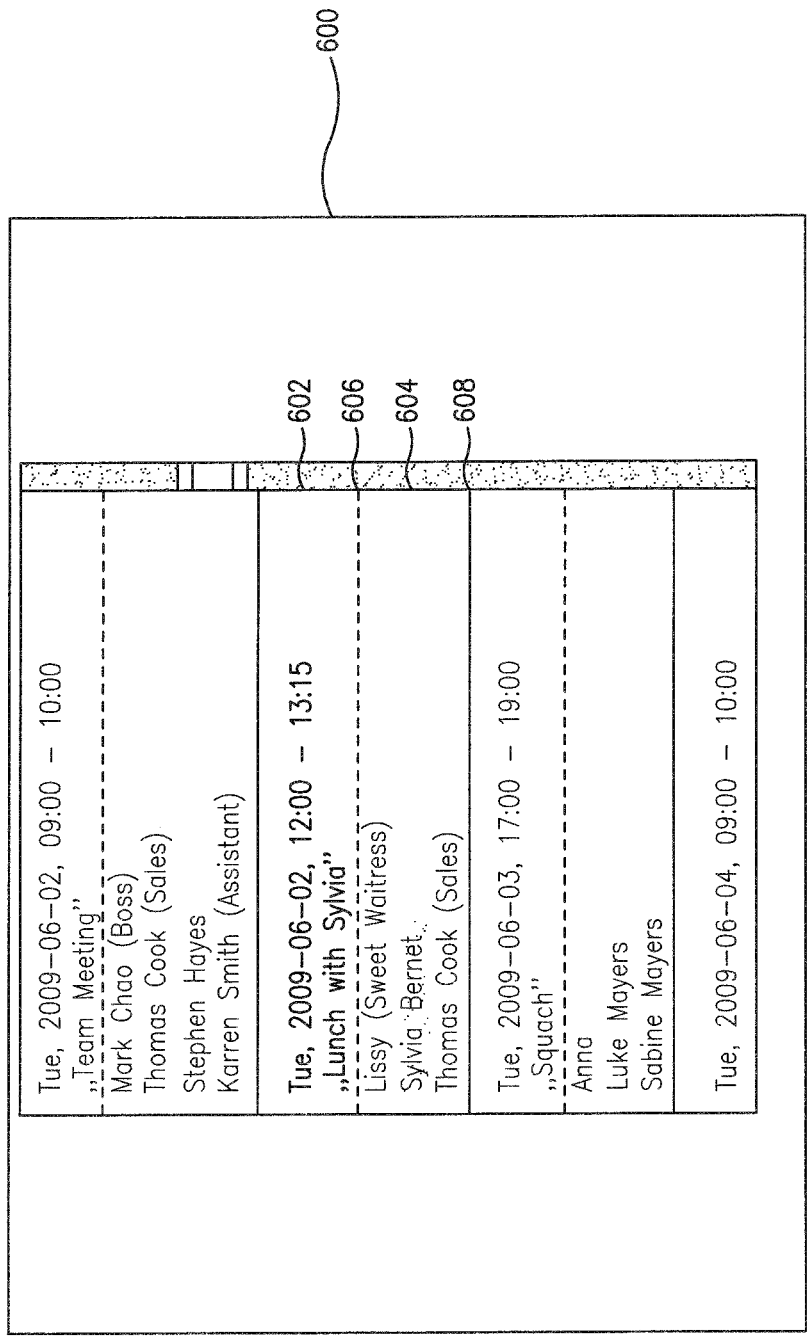
FIG. 6 is a embodiment of a graphical user interface screenshot implementing a list representation of the contact information illustrated in FIG. 5.

FIG. 6 illustrates the grouping of information illustrated in FIG. 5 on the user's display 600, but in a more text-oriented format. A user is again able to scroll through a list of meetings the user had arranged in a chronological order. Again, the "Lunch with Sylvia" meeting event 600 has both a title portion 602 and a contact portion 604 similar to that set forth above with respect to FIG. 5. In the illustrated example, the name "Sylvia Bernet" is highlighted to illustrate that the user has selected that particular contact within the user's address book. The dashed line 606 is utilized to separate the title and contact portions of the entry 600, while the solid lines 608 separate events from one another. Myriad other graphical and "mixed mode" (e.g., graphical and audible) presentation formats or architectures for the various data described above will be recognized by those of ordinary skill given the present disclosure.

The selection of the contact will then prompt the user to perform any number of tasks including for example: (1) the copying of the contact's name into memory (for use in composing a message as an example); (2) the editing of contact information associated with that particular contact entry; (3) the deletion of that entry from the user's address book; (4) the viewing of a log of all activities associated with that particular contact entry (i.e., e-mail messages, phone call details, texts, tweets, etc.); (5) the placement of telephone calls to various ones of that user's phone numbers (e.g., home, work, cell, etc.); (6) the e-mailing of that particular contact entry; (7) the SMS texting of that particular contact entry; and (8) the instant messaging of that particular contact entry, among other possible tasks.

Figure 7:
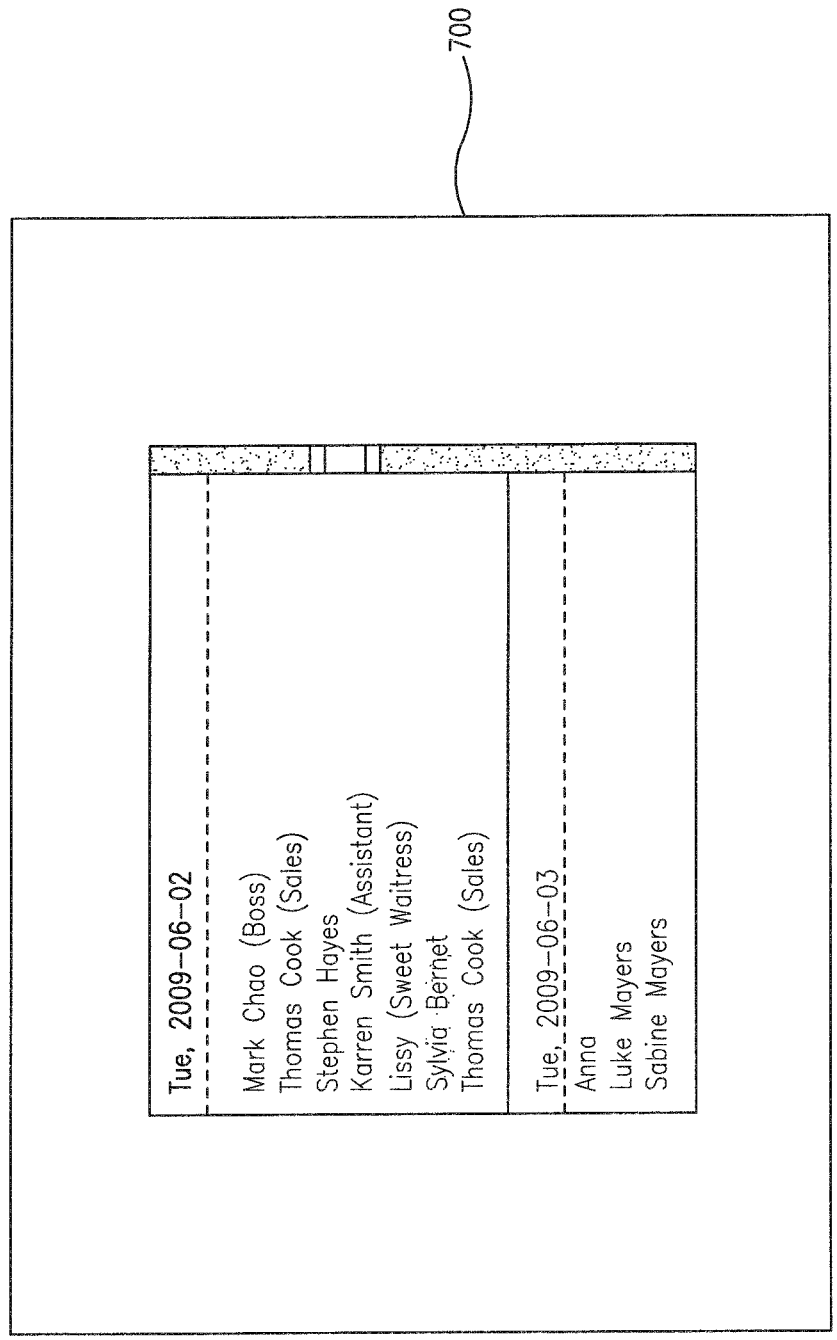
FIG. 7 is a second embodiment of a graphical user interface screenshot implementing a list representation of the contact information illustrated in FIG. 5.

FIG. 7 illustrates a similar list as set forth in FIG. 6 above; however, the contacts illustrated in the example of FIG. 7 are not grouped by meeting, but rather by day that they were met by the user. Such an option is particularly useful if the user did not have many meetings on a particular day or the meetings were not formally scheduled. In an alternative variant of that shown in FIG. 7, a mixture of the information illustrated in FIGS. 6 and 7 could also be readily implemented; i.e., the listing of contacts could include of a mixture of contacts present during meetings, as well as other contacts which were merely present with the user on a particular day.

Figure 8:
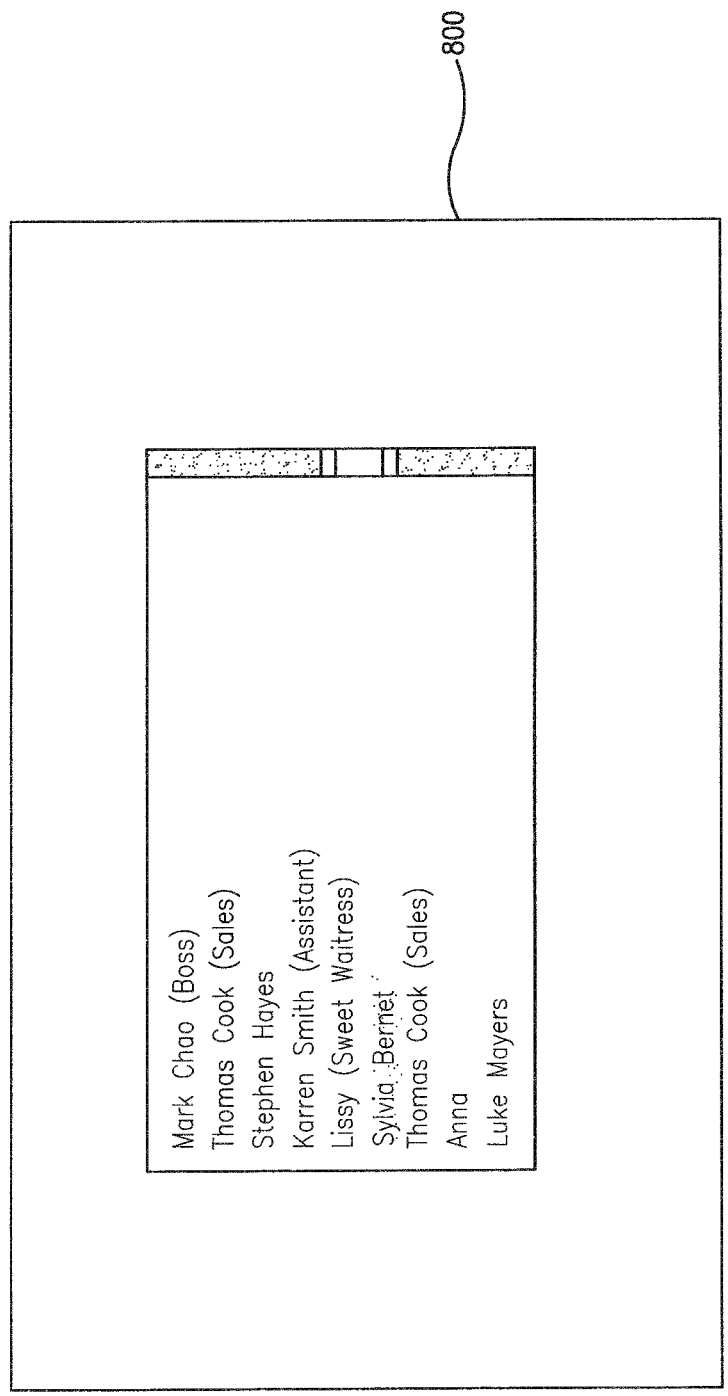
FIG. 8 is a third embodiment of a graphical user interface screenshot implementing a list representation of the contact information illustrated in FIG. 5.

Furthermore, while illustrated as being organized on a daily basis, it is appreciated that the address book representation could be organized on literally any other time period (e.g., intra-daily, bi-daily, weekly, monthly, etc.). Conversely, and as illustrated in FIG. 8, the contacts in a user's address book can alternatively not be grouped on any sort of given time period; i.e., they may simply be ordered in a chronological order without reference to any specific date or time.

In yet another alternative representation, individual contacts in a user's address book are grouped by location (e.g. where they are geographically co-located, or where they were in a phone conversation with the user while the user was in a particular geographic location). Such an implementation would have desirable benefits for distinguishing between groups of contacts such as: (1) work contacts; (2) home contacts; (3) social event contacts; or other common user geographic location associated contacts. For example, a user might visit a particular restaurant for happy hour with friends on a given day. These contacts would then be grouped together; i.e., because they are co-located at a particular location at the same time as the user. Accordingly, the user could easily select that particular group, and send out an SMS text, "tweet", or e-mail to all the members of that group letting them know when the user plans on arriving at the restaurant.

Figure 9:
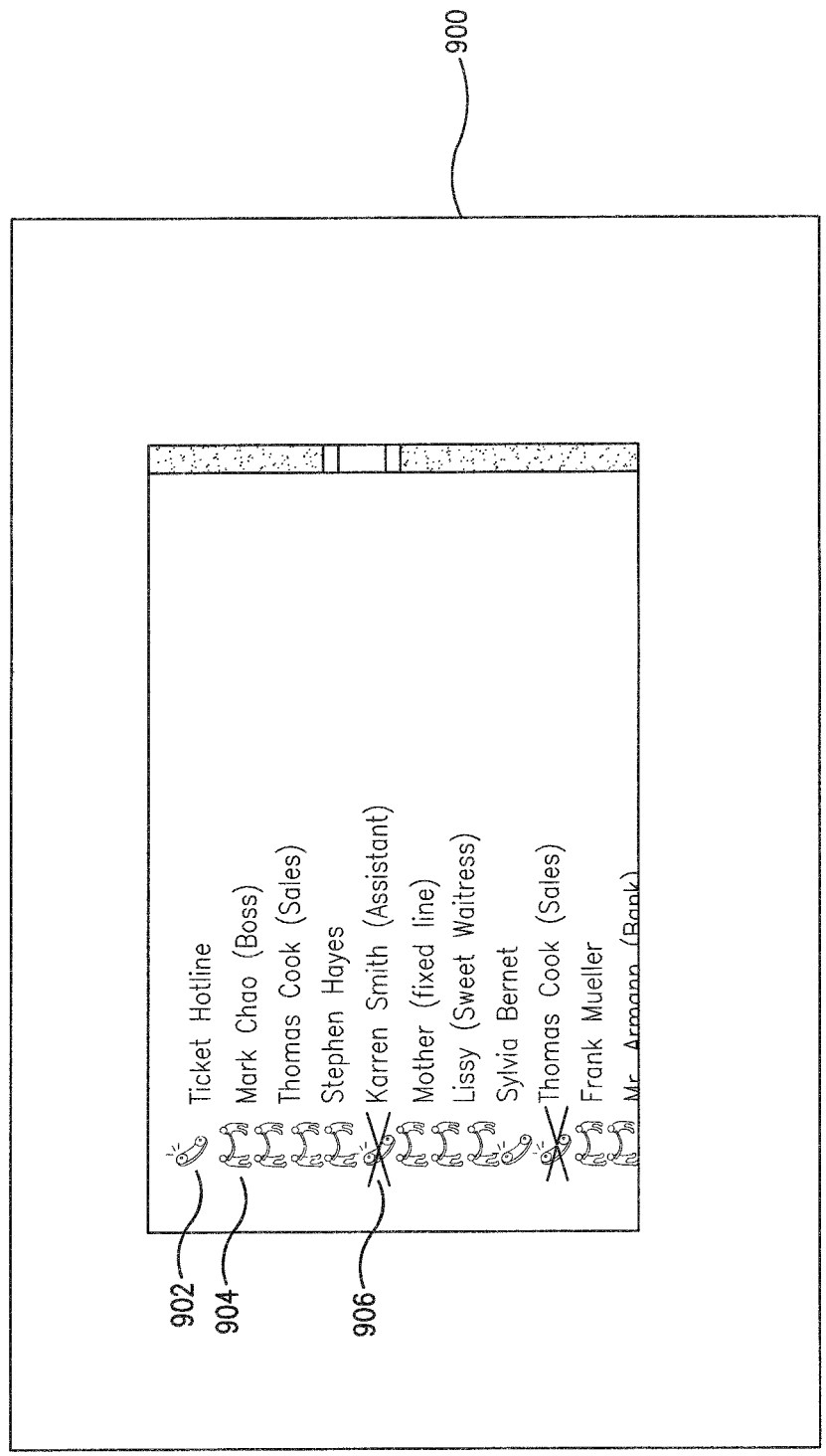
FIG. 9 is a fourth embodiment of a graphical user interface screenshot implementing a list representation of the contact information illustrated in FIG. 5.

FIG. 9 illustrates yet another variant of the information illustrated in FIGS. 5-8. In the embodiment illustrated, contact information 900 is arranged as discussed previously above (e.g., by time, geographic location, etc.). However, in addition to this listing of contact entries, additional information is presented which is indicative of the relationship between a particular entry and the user. For example, the entry 902 listed as "Ticket Hotline" is preceded by a phone icon. This phone icon is indicative of a conversation with that particular contact entry (preferably categorized as to whether it was a received phone call or a dialed phone call). Entry 904 labeled "Mark Chao (Boss)" is preceded by an icon which is indicative of a physical meeting that has taken place between the user and the contact listed in entry 904. Entry 906 labeled "Karren Smith (Assistant)" is preceded by an icon indicative of a missed call from that particular contact. Accordingly, contact information with regards to phone conversations (or even other forms of communication) and can be simultaneously organized with geographic meetings of contacts thereby providing an additional level of representation to the user's listing of contacts.

Example No. 2

Figure 10:
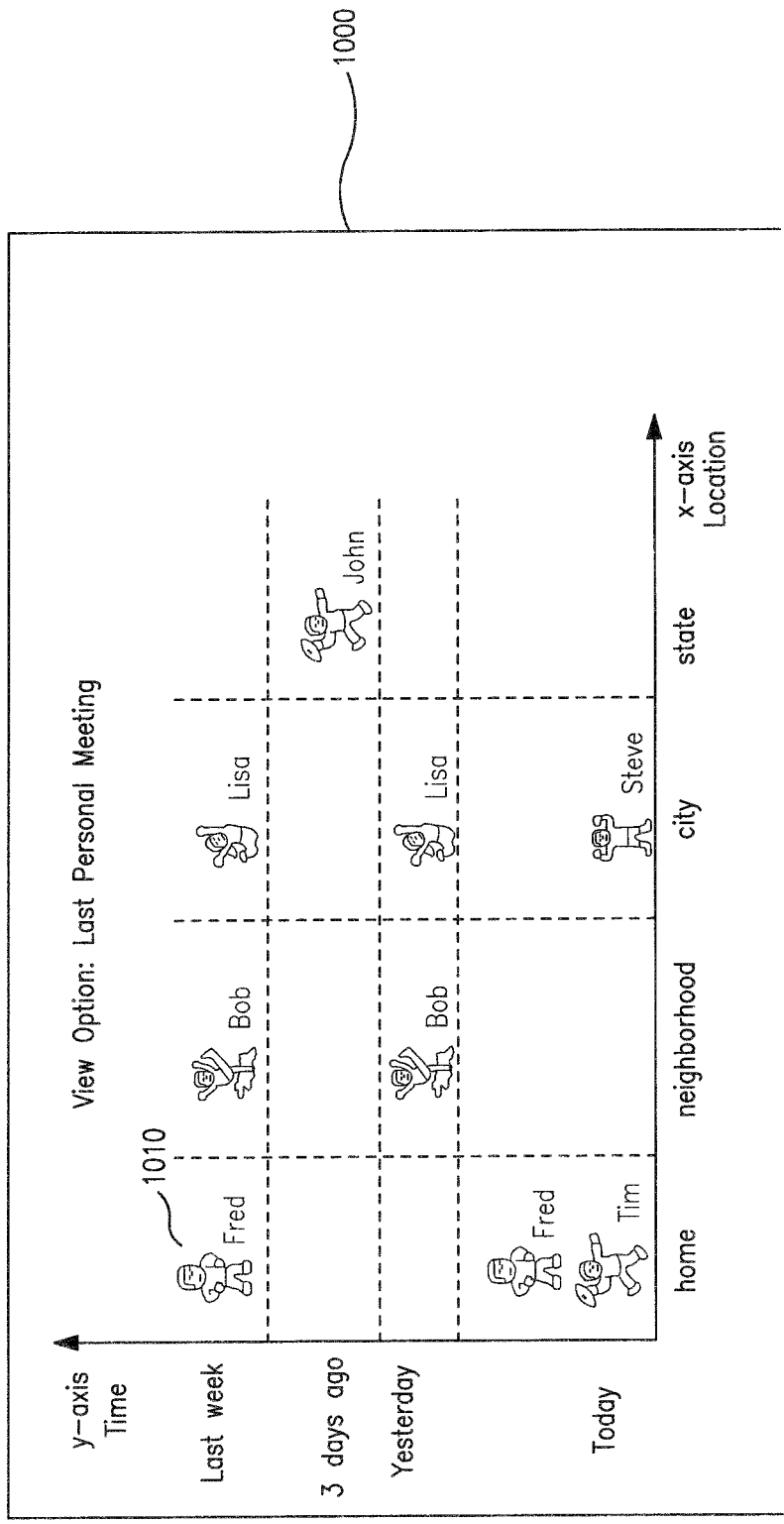
FIG. 10 is a graphical representation of one embodiment of a graphical user interface in accordance with the principles of the present invention, illustrating a two-dimensional representation of contact information.

Referring now to FIG. 10, yet another example address book representation according to the present invention is illustrated. Specifically, FIG. 10 illustrates a two-dimensional representation of address book entries in a user's address book. The two-dimensional representation illustrated shows individual contacts who have personally met with the user as a function of location taken along the x-axis or abscissa (e.g., at the user's home, neighborhood, city, state, etc.) and as a function of time along the y-axis or ordinate (e.g., today, yesterday, 3 days ago, last week, etc.). In this manner, a user can quickly take in the multiplicity of contacts that the user has come into contact with over a given period of time and over a variety of locales. The user can then simply select the icon representative of a contact entry to perform any number of common tasks. These tasks might for example include placing a phone call, e-mailing, texting, blogging, instant messaging, or editing contact information associated with that particular contact.

While illustrated as contacts which have personally met with the user, it is appreciated that the two-dimensional representation of FIG. 10 could readily be implemented for other categories, such as geographic locations of the user while placing a phone call or other data communication to that particular user. In an alternative implementation, a mixture of phone calls and personal meetings could be implemented similar to the discussion with respect to FIG. 9 above, thereby providing an added dimension to the graphical representation of contact entries in a user's address book.

In another variant to the graphical illustration of generic contacts for icons in FIG. 10, these icons 1010 can be readily replaced with icons that are indicative of some other relationship with that particular contact thereby adding another dimension to entries illustrated. For example, the icons preceding the entries in FIG. 9 (i.e., the dialed or received phone call, the meeting and the missed call) could readily replace or supplement the generic icons 1010 illustrated in FIG. 10. Furthermore, the icons 1010 illustrated in FIG. 10 could be replaced or supplemented with actual images (e.g., photographs) associated with that particular contact entry in a user's address book, or avatars associated with particular users (e.g., their "Yahoo!" IM avatar). The icons/images/avatars may also be embellished with static or dynamic information, such as what the user represented by the avatar is viewing or listening to (in terms of video, music, etc.) at that given time, their current availability status, etc.

Example No. 3

Figure 11:
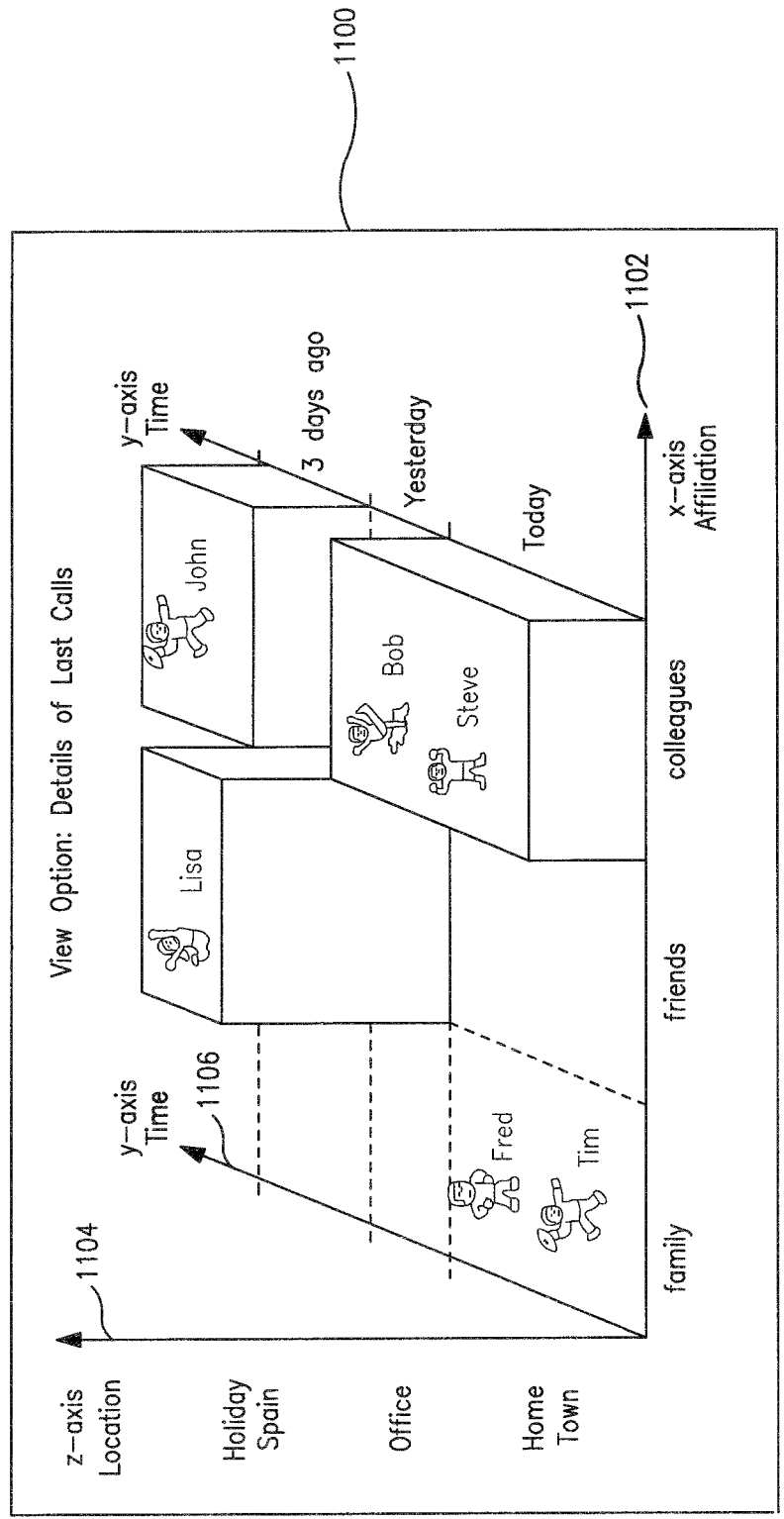
FIG. 11 is a graphical representation of one embodiment of a graphical user interface in accordance with the principles of the present invention, illustrating a three-dimensional representation of contact information.

Referring now to FIG. 11, yet another example illustrating the arrangement of contact information in a user's address book is shown. Specifically, the arrangement in FIG. 11 illustrates a three-dimensional representation of a user's contact entries. In the example illustrated, the axes of interest are: (i) affiliation to the user along the x-axis, (ii) location along the z-axis, and (iii) time along the y-axis. Such an arrangement is particularly suited for a user interface that incorporates a touch screen (e.g., a conventional touch screen, or so-called "multi-touch" screen such as that utilized on the exemplary iPhone™ product manufactured by the Assignee hereof), although it is appreciated that other user interfaces, such as a trackball/mouse, etc. could be readily adopted as well consistent with the invention.

Figure 12:
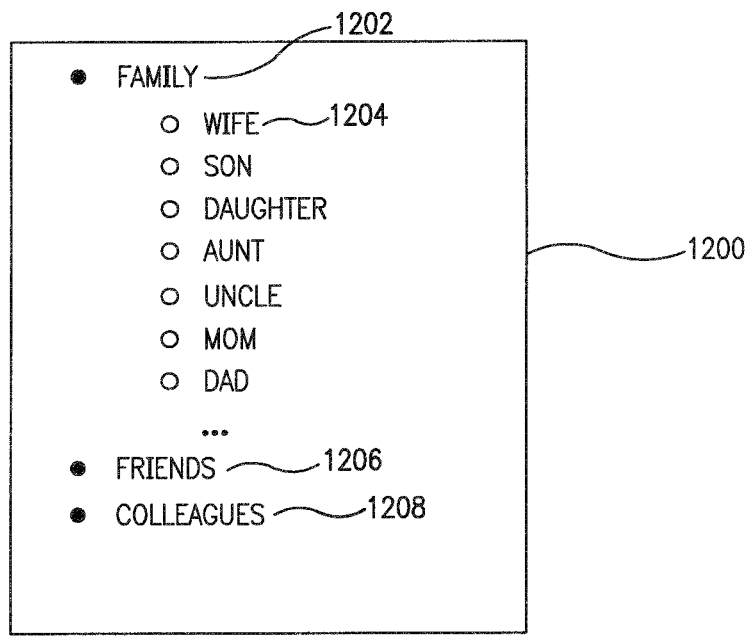
FIG. 12 is a graphical representation of one embodiment of a graphical user interface in accordance with the principles of the present invention, illustrating a pull-down menu structure.

In an exemplary arrangement of call data for a user as shown in FIG. 11, the categories have been automatically organized based on information available to the application that is arranging the data. For example, along the x-axis, the categories "family", "friends" and "colleagues" is present. This information can be gleaned directly from the user's contact entries, where individual entries in a user's address book are categorized under these or alternative categories which can be abstracted out into these three broad groups. For instance, if the user hadn't had contact with Lisa (who is his friend) within the last 3 days, the 'friends' row between 'family' and 'colleagues' on the x-axis would be missing in one embodiment of an automatically organized representation. FIG. 12 illustrates one embodiment of a pull-down menu available to the user for entering contact data for an entry in the user's address book. In the menu illustrated, family categories are used such as: wife, son, daughter, aunt, uncle, mom, dad, etc. These categories are all included under the broad general heading "family". Similar sub-headings would also optionally be available under the broad headings "friends" (e.g., close friends, acquaintances, "lost" friends, etc.) and "colleagues" (e.g., boss, co-worker, customer, etc.).

The location information present along the z-axis of the illustrated embodiment is pulled from the user's calendar entries and/or geographic location. For example, if a user has his/her home and work address stored under a contact entry for them, the arrangement application will have knowledge of whether or not the user is at home or at work based on e.g., contemporaneously obtained geographical information for that user. The contact entry "Holiday Spain" could be pulled from the user's calendar entry indicating the vacation. Alternatively, this entry can be pulled from a calendar entry for the user which simply says "Holiday" and the arrangement application will provide additional granularity by pulling geographic information from the user's location, here Spain.

The time axis is categorized for the convenience of the user. In the example illustrated, the time axis is organized into calls for "Today", "Yesterday" and "3 days ago"; however any number of schemes could be utilized. In an exemplary implementation, the time axis (as well as the other axes of interest) could be expanded or contracted using the multi-touch user interface capabilities previously described. For example, by having the user pinch two fingers together (or alternatively spread two fingers apart) along a display axis, the number of categories or scale on that axis can contract and expand, respectively.

In an alternative implementation, the number of categories shown in e.g. the time-axis is intelligently varied based the number of contact entries on the display of the device so as to minimize over-cluttering the screen with information such that selecting a particular contact by the user is made difficult.

In yet another alternative embodiment, the axes may remain fixed; however the user is given the option to zoom in on particular areas of the three-dimensional representation. This can be accomplished using any number of well known user interface technologies such as the aforementioned multi-touch technology.

Business Methods—

In one exemplary embodiment of the invention, much of the information stored for use in the later arrangement of data is collected and stored remotely on a network entity apparatus accessible by the user. Access to this data will then be based on a subscription-based service, under which individual users subscribe on a monthly, yearly, etc. basis in order to gain access to the data stored on the network. In an alternative implementation, the capabilities for the basic arrangement of data will pre-exist on the user's equipment at the time the user purchases the device (or via free download or upgrade for legacy devices). However, enhanced levels of address book arrangement services (e.g. "gold", "silver", etc.) will be available to the user on a subscription basis.

In another alternative embodiment, the user's contact data is obtained, stored and arranged in conjunction with a web-based social networking utility application (e.g. Facebook™, Myspace™, or the like). Accordingly, a business arrangement between the network operator and the social networking service provider/sponsor can be formed, which allows data stored on the social networking utility application to be readily accessible to the network operator (and/or vice versa).

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method for automatically prioritizing a plurality of contacts managed by a portable client device, the method comprising:
at the portable client device:
identifying a calendar event that is associated with a geographic location, a temporal component, and a subset of the plurality of contacts; and
in response to identifying that (i) the portable client device is proximate to the geographic location, and (ii) that the temporal component is satisfied:
creating a prioritized listing of the subset of the plurality of contacts based on the temporal component and a proximity to the geographic location prior to the calendar event,
determining, for each contact included in the prioritized listing of the subset of the plurality of contacts, whether the contact is proximate to the portable client device, wherein the portable client device detects a device of the contact using a short-range wireless transmission, and
based on the determining:
updating the prioritized listing of the subset of the plurality of contacts to indicate, for each contact in the prioritized listing of the subset of the plurality of contacts, whether the device of the contact is proximate to the portable client device during the calendar event.

2. The method of claim 1, wherein the plurality of contacts are not stored locally on the portable client device.

3. The method of claim 1, further comprising:
arranging the prioritized listing of the subset of the plurality of contacts according to communication information associated with the subset of the plurality of contacts.

4. The method of claim 1, wherein determining, for each contact included in the prioritized listing of the subset of the plurality of contacts, further comprises:
determining an elapsed time since a user of the portable client device is within a predetermined geographic proximity to the contact.

5. The method of claim 4, wherein creating the prioritized listing further comprises:
presenting a time sequential order of the subset of the plurality of contacts based on the elapsed times.

6. The method of claim 1, wherein identifying whether the portable client device is proximate to the geographic location comprises comparing a satellite-based fix of the client device to the geographic location.

7. The method of claim 1, wherein determining whether a contact is proximate to the portable client device involves using a hashing algorithm to securely anonymize the contact to the portable client device.

8. A non-transitory computer readable storage medium configured to store instructions that, when executed by a processor included in a portable client device, cause the portable client device to carry out steps that include:
identifying a calendar event that is associated with a geographic location, a temporal component, and a subset of a plurality of contacts; and
in response to identifying that (i) the portable client device is proximate to the geographic location, and (ii) temporal component is satisfied:
creating a prioritized listing of the subset of the plurality of contacts based on the temporal component and a proximity to the geographic location prior to the calendar event,
determining, for each contact included in the prioritized listing of the subset the plurality of contacts, whether the contact is proximate to the portable client device, wherein the portable client device detects a device of the contact using a short-range wireless transmission, and
based on the determining:
updating the prioritized listing of the subset of the plurality of contacts to indicate, for each contact in the prioritized listing of the subset of the plurality of contacts, whether the device of the contact is proximate to the portable client device during the calendar event.

9. The non-transitory computer readable storage medium of claim 8, wherein the plurality of contacts are not stored locally on the portable client device.

10. The non-transitory computer readable storage medium of claim 8, wherein the steps further include:
arranging the prioritized listing of the subset of the plurality of contacts according to communication information associated with the subset of the plurality of contacts.

11. The non-transitory computer readable storage medium of claim 8, wherein the steps further include:
determining an elapsed time since a user of the portable client device is within a predetermined geographic proximity to the contact.

12. The non-transitory computer readable storage medium of claim 11, wherein the steps further include: presenting a time sequential order of the subset of the plurality of contacts based on the elapsed times.

13. The non-transitory computer readable storage medium of claim 8, wherein identifying whether the portable client device is proximate to the geographic location comprises comparing a satellite-based fix of the client device to the geographic location.

14. A method for automatically prioritizing a plurality of contacts managed by a portable client device, the method comprising:
at the portable client device:
identifying a calendar event that is associated with a geographic location, a temporal component, and a subset of the plurality of contacts; and
in response to identifying that (i) the portable client device is proximate to the geographic location, and (ii) that the temporal component is satisfied:
creating a prioritized listing of the subset of the plurality of contacts based on the temporal component and a proximity to the geographic location prior to the calendar event, wherein the prioritized listing is presented in a two-dimensional representation that includes a first axis that corresponds to a location-based function, and a second axis that corresponds to a time-based function,
determining, for each contact included in the prioritized listing of the subset of the plurality of contacts, whether the contact is proximate to the portable client device, wherein the portable client device detects a device of the contact using a short-range wireless transmission, and
based on the determining:
updating the prioritized listing of the subset of the plurality of contacts to indicate, for each contact in the prioritized listing of the subset of the plurality of contacts, whether the device of the contact is proximate to the portable client device during the calendar event.

15. The method of claim 14, further comprising:
grouping the subset of the plurality of contacts within the two-dimensional representation according to the location-based function.

16. The method of claim 14, further comprising:
arranging the prioritized listing of the subset of the plurality of contacts according to communication information associated with the subset of the plurality of contacts.

17. A method for automatically prioritizing a plurality of contacts managed by a portable client device, the method comprising:
at the portable client device:
identifying a calendar event that is associated with a geographic location, a temporal component, and a subset of the plurality of contacts; and
in response to identifying that (i) the portable client device is proximate to the geographic location, and (ii) that the temporal component is satisfied:
creating a prioritized listing of the subset of the plurality of contacts based on the temporal component and a proximity to the geographic location prior to the calendar event,
determining, for each contact included in the prioritized listing of the subset of the plurality of contacts, whether the contact is proximate to the portable client device, wherein the portable client device detects a device of the contact using a short-range wireless transmission, and
based on the determining:
updating the prioritized listing of the subset of the plurality of contacts to indicate, for each contact in the prioritized listing of the subset of the plurality of contacts, whether the device of the contact is proximate to the portable client device during the calendar event, wherein the indication is provided via a two-dimensional representation.

18. The method of claim 17, wherein the two-dimensional representation includes a first axis that corresponds to a location-based function and a second axis that corresponds to a time-based function.

19. The method of claim 17, wherein determining whether a contact is proximate to the portable client device involves using a hashing algorithm to securely anonymize the contact to the portable client device.

20. A portable client device configured to automatically prioritize a plurality of contacts, the portable client device comprising:
 a processor;
 a storage device in data communication with the processor; and
 a memory configured to store instructions that, when executed by the processor, cause the portable client device to carry out steps that include:
  identifying a calendar event that is associated with a geographic location, a temporal component, and a subset of the plurality of contacts; and
  in response to identifying that (i) the portable client device is proximate to the geographic location, and (ii) that the temporal component is satisfied:
   creating a prioritized listing of the subset of the plurality of contacts based on the temporal component and a proximity to the geographic location prior to the calendar event,
   determining, for each contact included in the prioritized listing of the subset of the plurality of contacts, whether the contact is proximate to the portable client device, wherein the portable client device detects a device of the contact using a short-range wireless transmission, and
   based on the determining:
    updating the prioritized listing of the subset of the plurality of contacts to indicate, for each contact in the prioritized listing of the subset of the plurality of contacts, whether the device of the contact is proximate to the portable client device during the calendar event.

21. The portable client device of claim 20, wherein the steps further include:
 arranging the prioritized listing of the subset of the plurality of contacts according to communication information associated with the subset of the plurality of contacts.

22. The portable client device of claim 20, wherein the steps further include:
 enabling at least one of a relative or an absolute geo-positioning of the portable client device to determine whether the subset of the plurality of contacts are proximate to the portable client device.

\* \* \* \* \*